(12) United States Patent
Wijayasekara et al.

(10) Patent No.: US 10,642,759 B2
(45) Date of Patent: May 5, 2020

(54) INTERFACE FROM NULL CONVENTION LOGIC TO SYNCHRONOUS MEMORY

(71) Applicant: Eta Compute, Inc., Westlake Village, CA (US)

(72) Inventors: Vidura Manu Wijayasekara, Thousand Oaks, CA (US); Ben Wiley Melton, Thousand Oaks, CA (US); Bryan Garnett Cope, Austin, TX (US)

(73) Assignee: Eta Compute, Inc., Westlake Village, CA (US)

( * ) Notice: Subject to any disclaimer, the term of this patent is extended or adjusted under 35 U.S.C. 154(b) by 293 days.

(21) Appl. No.: 15/950,844

(22) Filed: Apr. 11, 2018

(65) Prior Publication Data

US 2018/0300263 A1 Oct. 18, 2018

Related U.S. Application Data

(60) Provisional application No. 62/484,770, filed on Apr. 12, 2017.

(51) Int. Cl.
| | |
|---|---|
| *G06F 1/12* | (2006.01) |
| *G06F 13/10* | (2006.01) |
| *G06F 1/32* | (2019.01) |
| *G06F 13/16* | (2006.01) |

(52) U.S. Cl.
CPC .............. *G06F 13/102* (2013.01); *G06F 1/12* (2013.01); *G06F 1/32* (2013.01); *G06F 13/1689* (2013.01)

(58) Field of Classification Search
CPC ...... G06F 1/12; G06F 13/1689; G06F 13/102; H04J 3/18
See application file for complete search history.

(56) References Cited

U.S. PATENT DOCUMENTS

| | | | | |
|---|---|---|---|---|
| 2008/0005492 A1* | 1/2008 | Leung | ........... | G11C 7/1075 |
| | | | | 711/149 |
| 2010/0327923 A1* | 12/2010 | Pyeon | ........... | G06F 1/08 |
| | | | | 327/145 |
| 2018/0011709 A1* | 1/2018 | Zbiciak | ........... | G06F 9/345 |

* cited by examiner

*Primary Examiner* — Ernest Unelus
(74) *Attorney, Agent, or Firm* — SoCal IP Law Group LLP; Angelo Gaz; Steven Sereboff

(57) ABSTRACT

Self-timed processing systems and methods of operating self-timed processing systems are disclosed. A self-timed processing system includes an asynchronous null convention logic (NCL) processor, a memory that accepts input signals on an active edge of a memory clock signal, and logic to combine a first acknowledge signal and a second acknowledge signal to generate the memory clock signal. The first acknowledge signal indicates input signals are ready to be accepted by the memory. The second acknowledge signal indicates data signals previously output from the memory have been accepted by the processor.

19 Claims, 4 Drawing Sheets

INTERFACE FROM NULL CONVENTION LOGIC TO SYNCHRONOUS MEMORY

RELATED APPLICATION INFORMATION

This patent claims priority from provisional patent application 62/484,770, filed Apr. 12, 2017, titled INTERFACE FROM NULL CONVENTION LOGIC TO SYNCHRONOUS MEMORY.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to asynchronous digital processors.

Description of the Related Art

In this patent, the term "processor" means a digital circuit that performs some sequence of operations. A processor may typically, but not necessarily, execute stored instructions to accomplish its assigned function. Processors that typically execute stored instructions include microprocessors, microcontrollers, digital signal processors, and coprocessors. Processors that do not execute stored instructions include single-purpose processors such as encryption engines and fast Fourier transform engines. The sequence of operations performed by such engines may be controlled, for example, by a hardware state machine rather than stored instructions.

Most digital processors in use today are synchronous, which is to say various elements within the digital processor operate synchronously in response to a common clock signal. The power consumption of a synchronous processor depends on the complexity of the processor (i.e. the number of gates and other functional elements), the clock rate, and the operating voltage. In general, higher operating speed requires higher operating voltage.

Asynchronous, or self-timed, processor circuits do not operate from a common clock signal, such that the delay of a self-timed processor is determined solely by the cumulative delay of the gates and other logic elements within the self-timed processor. Self-timed processors are typically operated in a cyclic manner. A cycle is initiated when input data is provided to the processor. The processor then performs some operation upon the input data, with the time required to perform the operation determined by the accumulated delays of the logic circuits within the processor. When the operation is complete and all of the outputs of the processor have assumed their final values, a feedback or acknowledge signal may be generated to indicate completion of the current cycle and readiness to begin the next cycle.

To achieve the lowest possible power consumption, it may be preferable to operate an asynchronous processor at a voltage near or below the transistor threshold voltage. However, the delay of near-threshold and below-threshold logic gates may vary by a factor of up to 100 over an operating temperature range. Further, the delay may vary by a factor of five or more between gates on the same integrated circuit at a single temperature. As a consequence, it is difficult, if not impossible, to predict the delay time for near-threshold voltage operation of asynchronous logic circuits. Thus, asynchronous processors are typically design to include completion detection logic circuits to determine when the processor has completed a processing cycle.

Null convention logic (NCL) is a delay-insensitive logic paradigm in which each Boolean variable has three defined states: "True", "False", and "null", where the null state indicates that a valid value is not yet available. In this patent, the term "valid" means a Boolean variable is in either the True or False states. NCL processors typically employ a combination of dual-rail logic and threshold gates.

Dual-rail logic is a form of NCL that uses two signals or rails, each of which has two possible values (1 or 0), to represent each Boolean variable. In this patent, the two signals will be referred to as the "true" and "false" rail. For a Boolean variable "A", the two rails will be designated as AT, and AF. A Boolean "1" or "true" state is represented by AT=1, AF=0, and a Boolean "0" or "false" state is represented by AT=0, AF=1. Either of these are "valid" or "valid states". The null state is represented by AT=AF=0. The state AT=AF=1 is forbidden. Another form of NCL uses four rails or signals to collectively represent two Boolean variables. In this patent, the term "multi-rail" encompasses both dual-rail and four-rail implementations of NCL.

Threshold gates are a type of logic gate, where "gate" is defined as a logic circuit having two or more inputs combined into a single output. The output of a threshold gate is set to 0 only when all of its inputs are 0. The output of a threshold gate is set to 1 when a predetermined combination of inputs are all 1. With other combinations of inputs, the output of the threshold gate retains its previous value. A nomenclature commonly used to describe some types of threshold gates is "THmn", where n and m are integers between one and four. "n" is the number of inputs to the gate, and "m" is the number of inputs that must be 1 for the output of the gate to switch to 1.

An NCL processor is typically operated in a cyclical manner. All of the inputs to an NCL processor are initially set to the null state, which then propagates through the processor until all of the outputs of the processor assume the null state. When all of the outputs of the processor are in the null state, the processor sets an acknowledge signal output to a first state (commonly called "request for data") indicating the processor is ready for new data. The inputs to the processor are then set to valid states, which then propagate through the processor until all of the outputs also assume valid states. When all of the outputs have assumed valid states, the cycle is complete and the acknowledge signal is set to a second state (commonly called "request for null") to initiate the next cycle. An NCL processor may be divided into multiple functional blocks typically arranged as a pipeline. In this case, each functional block may generate a respective acknowledge signal that is provided to the predecessor functional block in the pipeline.

DETAILED DESCRIPTION

Description of Apparatus

Figure 1:
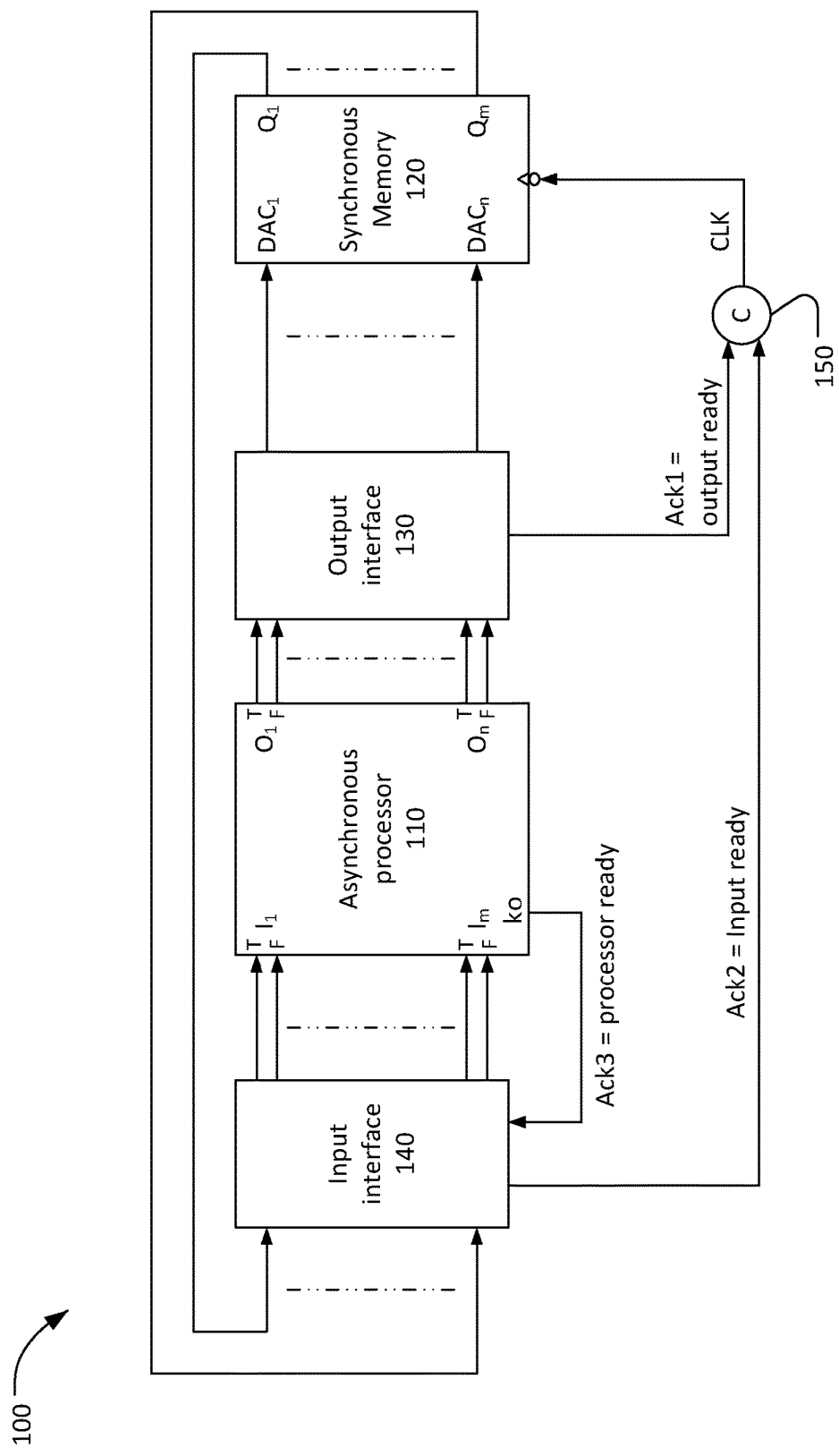
FIG. 1 is a block diagram of a processing system including an NCL asynchronous processor and a synchronous memory.

Asynchronous processors implemented using null convention logic (NCL) may need to interface with synchronous, or clocked, memory such as static random-access memory (SRAM) or read-only memory (ROM). FIG. 1 is a block diagram of a processing system 100 including an NCL asynchronous processor 110 and a synchronous memory 120. The synchronous memory 120 may be, for example static random-access memory (RAM) or read-only memory (ROM). The synchronous memory 120 may comprise one or more integrated circuit devices separate from the asynchronous processor. The synchronous memory 120 may be a portion of an integrated circuit device that also contains all or portions of the asynchronous processor 110.

The operation of the synchronous memory 120 is synchronized by a clock signal CLK. A variety of data, address, and control input signals are accepted by, or loaded into, the synchronous memory on an active edge (i.e. either the rising edge or the falling edge) of the clock signal. After a delay, output data is available at the outputs of the memory. The delay between the active edge of the clock signal and the availability of output data is commonly called the "access time" of the memory. In FIG. 1, the input signals to the synchronous memory 120 are identified as $DAC_1$ (data/address/control) to $DAC_n$, where n is a positive integer. The output data from and input signals to the memory are single rail, binary data. The output data signals from the synchronous memory 120 are identified in FIG. 1 as $Q_1$ to $Q_m$, where m is a positive integer equal to the "width" of the data stored in the memory. For example, a 1 megabyte memory organized as 512 k×16 bits may require 16 data inputs, 19 address inputs, and various control inputs such as chip selects, write enable, mode selects, and other control signals. In this case n may be about 40 and m=16.

In the example of FIG. 1, the input signals $DAC_1$ to $DAC_n$ are accepted by the synchronous memory 120 on the falling edge of a clock signal CLK. Memories that accept input signals on the rising edge of the clock may be accommodated by simply inverting CLK. In this context, the phrase "accepted by" means a signal is captured or held by a circuit (e.g., a latch or register) within a device such as a memory or processor.

The processing system 100 also includes an output interface 130 and an input interface 140. The output interface 130 converts dual-rail NCL output signals $O_1$ to $O_n$ from the asynchronous processor 110 into single-rail input signals $DAC_1$ to $DAC_n$ for the synchronous memory 120. The output interface 130 also generates a first acknowledge signal Ack1 indicating that the outputs of the output interface 130 are ready to be received, which is to say new signals (i.e. signals that have not been previously accepted by the synchronous memory) $DAC_1$ to $DAC_n$ are available to be accepted by the synchronous memory 120.

The input interface 140 provides a second acknowledge signal Ack2 indicating the input interface is ready to receive new data from the memory 120.

The input interface 140 also converts the single-rail output data signals $Q_1$ to $Q_m$ from the synchronous memory 120 into dual-rail input signals $I_1$ to $I_m$ to the asynchronous processor 110. The input interface 140 causes the dual-rail input signals $I_1$ to $I_n$, to the asynchronous processor 110 to alternate between the null state and the dual-rail equivalents of $Q_1$ to $Q_m$ in response to a third acknowledge signal Ack3 output from the asynchronous processor 110. One state of Ack3 (request for null) causes the input interface 140 to set signals $I_1$ to $I_m$ to the null state. The asynchronous processor 110 switches Ack3 to request for null when the processor, having accepted and completed processing the signals previously output from the S2D elements, is ready to begin the next processing cycle. The processor 110 switches Ack3 to request for data to cause the input interface 140 to forward dual rail equivalents of $Q_1$ to $Q_m$ to the asynchronous processor 110. Switching tAck3 to request for data may occur when all of the registers or elements of processor 110 are in or reach the null state, such as when processor 110 is ready to accept valid data input signals.

Ack1 and Ack2 are combined by a "C element" 150 to generate the clock for the memory 120. A C element is a gate that implements a "coincidence" function. Specifically, the output of a C element is set to a first state when both inputs are in the first state, and the output of the C element is set to a second state when both inputs are in the second state. For other combinations of inputs, the output of a C element retains its previous state. A C element is equivalent to a TH22 threshold gate. In this case, the output of the C element 150 clocks the memory when both Ack1 and Ack2 are in the "ready" state. Specifically, the output of the C element 150 clocks the synchronous memory 120 upon the later of Ack1 and Ack2 switching to the ready state while the earlier of Ack1 and Ack2 is still in the ready state. Subsequently, both Ack1 and Ack2 must change to the respective "not ready" states and return to the ready state in order to generate the next clock to the synchronous memory 120. Generating the clock for the synchronous memory 120 in this manner assures that the clock edge occurs only after the inputs to the memory are available from output interface 130 and the data previously output from the memory has been accepted by the processor 110.

Figure 2:
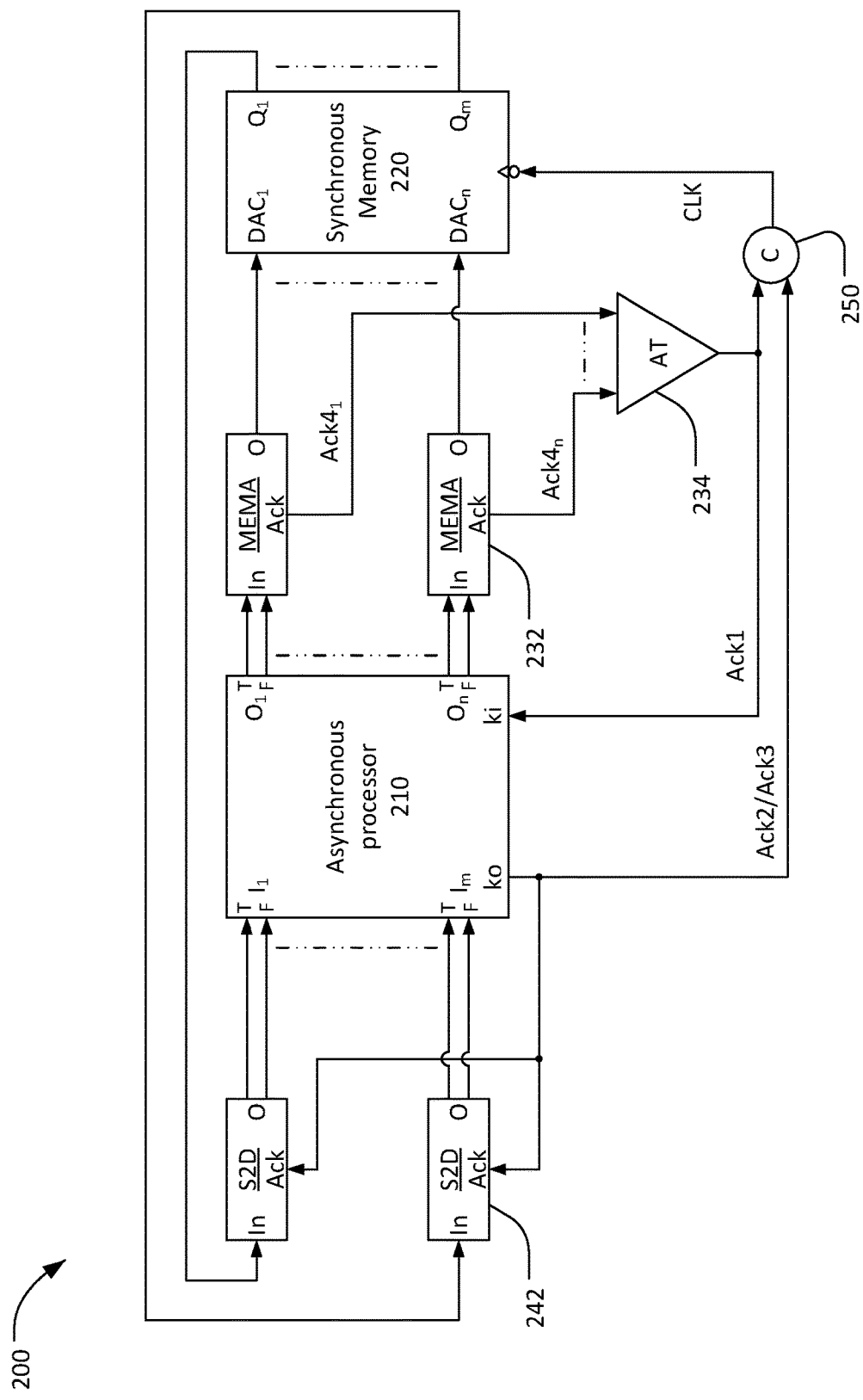
FIG. 2 is a block diagram of another processing system including an NCL asynchronous processor and a synchronous memory.

FIG. 2 is a block diagram of a processing system 200 which is an embodiment of the processing system 100 of FIG. 1. The processing system 200 includes an asynchronous processor 210 and a synchronous memory 220 which are comparable to (e.g., may be the same device as or function the same as) the corresponding elements 110 and 120 of the processing system 100, respectively.

In FIG. 2, elements labeled MEMA (such as element 232) are dual-rail input, single-rail output memory/acknowledge elements. The single-rail output is updated to the corresponding single rail, binary data when the dual-rail input is in a valid data state and retains the previous value when the dual-rail input is in the null state. Each MEMA element generates a respective fourth acknowledge signal ($Ack4_1$-$Ack4_n$). Each of the fourth acknowledge signals switches to the request for null state when valid data is presented at the dual rail input of the respective MEMA element and the single rail output is updated. Each of the fourth acknowledge signals switches to the request for data state when the dual rail input to the respective MEMA element is in the null state.

The element 234 labeled AT is an "acknowledge tree", which is a tree of threshold gates used to combine multiple acknowledge signals. An acknowledge tree may also be referred to as a "completion tree" or "completion block." The output of an acknowledge tree is set to zero when all of its inputs are zero, and is set to one when all of its inputs are one. For other combinations of inputs, the output retains its previous state. In the example of FIG. 1, binary 0 is the request for null state of any acknowledge signal and binary 1 is the request for data state of any acknowledge signal. The output Ack1 from the acknowledge tree 130 switches to 0 (request for null) when the Ack outputs from all of the MEMA elements are 0. Thus the falling edge of the signal Ack1 indicates all of the MEMA elements have updated outputs and the input signals $DAC_1$ to $DAC_n$ are ready to be received by the synchronous memory 120.

Elements labeled "S2D" (such as element 242) are single rail to dual rail converters. S2D elements accept a single-rail binary input and an acknowledge (Ack) input. The dual-rail outputs from the S2D element are set to the null state when the acknowledge input is in the request for null state and are a valid two-rail conversion of the single-rail binary input when the acknowledge input is in the request for data state.

The Ack inputs of the S2D elements receive the Ack3 signal output from the asynchronous processor 210. As previously described, the asynchronous processor 210 switches Ack3 to request for null when the processor, having accepted and completed processing the signals previously output from the S2D elements, is ready to begin the next processing cycle. In the processing system 200, the Ack3 signal output from the asynchronous processor 210 is also used as the Ack2 signal input to the C element 250. The output of the C element clocks the synchronous memory 220 when both the Ack2/Ack3 signal output from the asynchronous processor 210 and the Ack1 signal from the acknowledge tree 234 are both in the request for null state. Specifically, the output of the C element 250 may clock the synchronous memory 220 upon the later of Ack1 and Ack2/Ack3 switching to the ready state while the earlier of Ack1 and Ack2/Ack3 is still in the ready state.

Using the acknowledge output Ack3 from the asynchronous processor for Ack2 to C element 250 in FIG. 2 reduces the number of gates required to generate the memory clock signal CLK (e.g., by not requiring logic within the input interface 140 used to generate Ack2 of FIG. 1) but has a potential timing hazard or a "race" condition. This hazard may occur if the falling edge of CLK clocks the memory 220 before the outputs of the S2D elements are switched to the null state. In this case, there is a possibility that data output from the memory 220 after the active edge of the clock may be passed through the S2D elements prematurely (e.g., prior to the S2D elements obtaining the null state). This hazard could occur, for example, if the layout of the elements of the processing system 200 allowed the Ack2/Ack3 signal to reach the C element 250 well before the Ack2/Ack3 signal reached one or more of the S2D elements. The possibility of this hazard occurring may be minimized by appropriate system layout and routing (e.g. by ensuring that the trace length of the signal line from the Ack3 output of the asynchronous processor 210 to the C element 250 is longer than the trace length of the signal line from that Ack3 output to each of the S2D elements).

Figure 3:
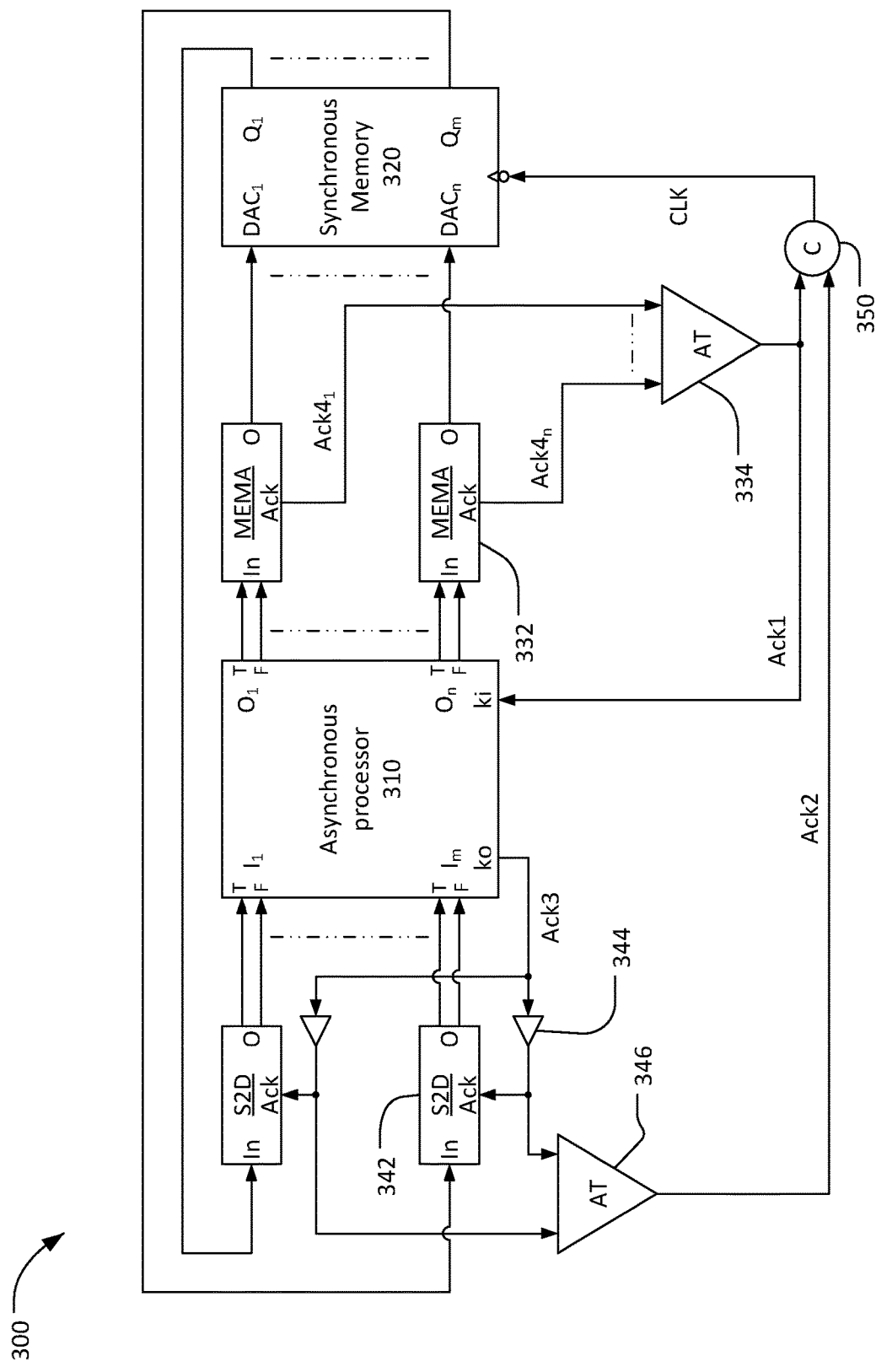
FIG. 3 is a block diagram of another processing system including an NCL asynchronous processor and a synchronous memory.

FIG. 3 is a block diagram of a processing system 300 which is another embodiment of the processing system 100 of FIG. 1. The processing system 300 includes an NCL asynchronous processor 310 and a synchronous clocked memory 320 which are comparable to the corresponding elements 110 and 120 of the processing system 100, respectively. The processing system 300 includes MEMA elements (such as the MEMA element 332), a first acknowledge tree 334, and S2D elements (such as the S2D element 342) that are comparable to the corresponding elements 232, 234 and 242 of the processing system 200, respectively.

In the processing system 300, the Ack3 signal output from the asynchronous processor 310 is routed to the Ack inputs of the S2D elements. The Ack3 signal may be routed to the S2D elements through optional buffers, such as the buffer 344. The signals provided to the Ack inputs of the S2D elements are also individually routed to a second acknowledge tree (AT) 346 that generates the Ack2 signal. AT 346 may be comparable to the corresponding element AT 334. The Ack2 signal is set to zero when the all of the Ack3 signals are zero. The Ack2 signal is set to one when all of the Ack3 signals are one. For other combinations of Ack3 inputs, the Ack2 output retains its previous state. The C element 350 combines the Ack2 signal and the Ack1 signal to generate the clock for the clocked memory 320. The addition of the second acknowledge tree 346 ensures that the Ack3 signal has reached all of the S2D elements before the memory 320 is clocked.

Figure 4:
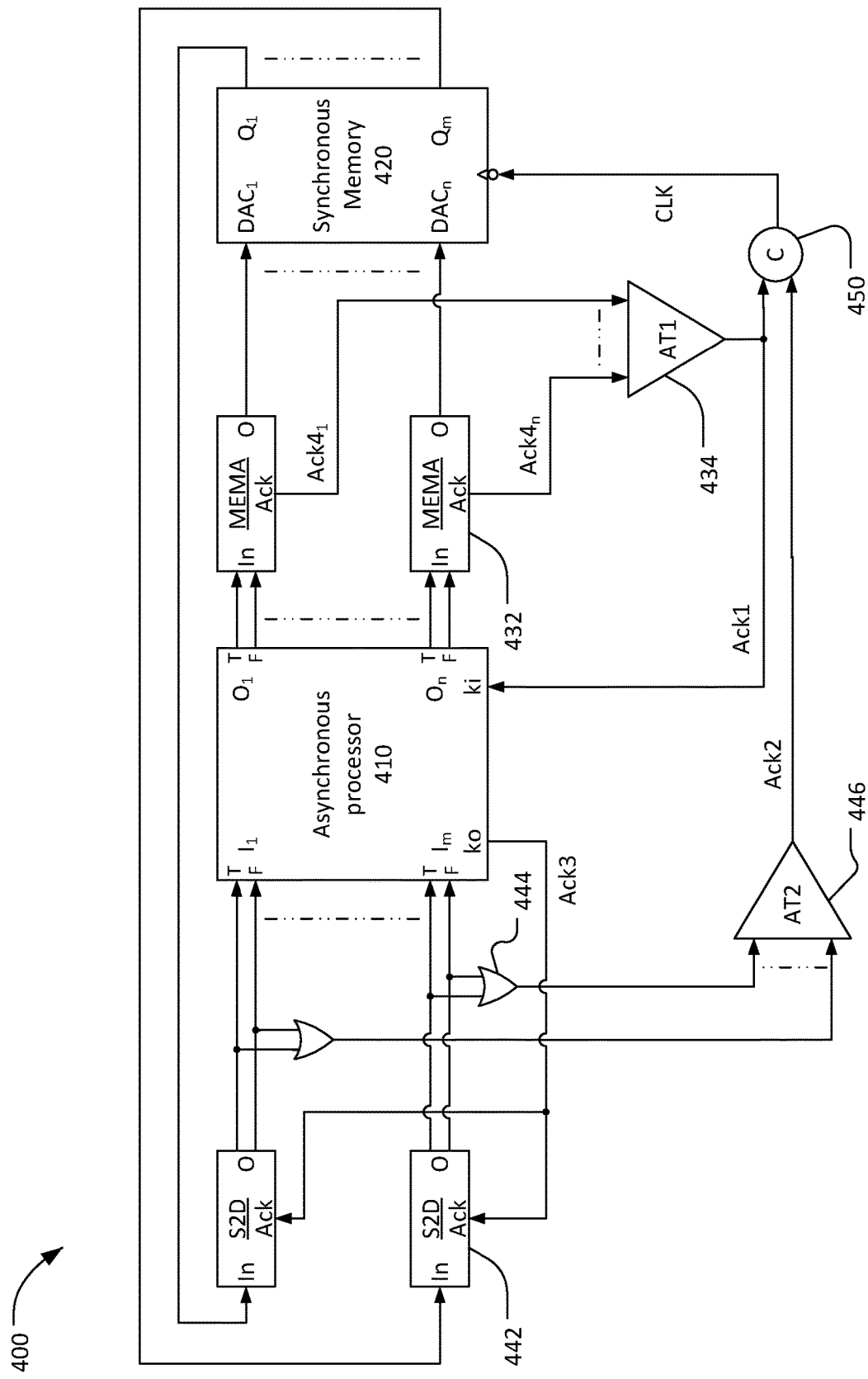
FIG. 4 is a block diagram of another processing system including an NCL asynchronous processor and a synchronous memory.

FIG. 4 is a block diagram of a processing system 400 which is another embodiment of the processing system 100 of FIG. 1. The processing system 400 includes an NCL asynchronous processor 410 and a synchronous memory 420 which are comparable to the corresponding elements 110 and 120 of the processing system 100, respectively. The processing system 400 includes MEMA elements (such as the MEMA element 432), a first acknowledge tree (AT1) 434, and S2D elements (such as the S2D element 442) that are comparable to the corresponding elements 232, 234 and 242 of the processing system 200, respectively.

In the processing system 400, the Ack3 signal output from the asynchronous processor 410 is routed to the Ack inputs of the S2D elements. Respective OR gates, such as the OR gate 444 determine if the output of the corresponding S2D element is in the Null state or a valid state. The outputs of the OR gates are combined by a second acknowledge tree (AT2) 446 that generates the Ack2 signal. AT2 446 may be comparable to the corresponding element AT1 346. The Ack2 signal is set to zero when the outputs of all of the S2D elements are Null. The Ack2 signal is set to one when the outputs of all of the S2D elements are valid. For other combinations of inputs, the Ack2 output retains its previous state. The C element 350 combines the Ack2 signal and the Ack1 signal to generate the clock for the synchronous memory 320. The use of the second acknowledge tree 346 guarantees that the outputs of all of the S2D elements are null before the memory 320 is clocked.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A self-timed processing system comprising:
    an asynchronous null convention logic (NCL) processor;
    a memory that accepts input signals on an active edge of a memory clock signal;
    first converter circuits to convert one or more dual-rail NCL values output from the processor to single-rail input signals coupled to respective inputs of the memory;
    second converter circuits to convert one or more single-rail data signals output from the memory to dual-rail values coupled to respective inputs of the processor; and
    logic to combine a first acknowledge signal and a second acknowledge signal to generate the memory clock signal,
    the first acknowledge signal indicating that the single-rail input signals are ready to be accepted by the memory, and
    the second acknowledge signal indicating that dual-rail values based on single-rail data signals previously output from the memory have been accepted by the processor.

2. The self-timed processing system of claim 1, wherein the logic to combine the first and second acknowledge signals comprises a C element.

3. The self-timed processing system of claim 1, wherein the second converter circuits further comprise:
    one or more single to dual converter (S2D) elements respectively coupled between single-rail outputs of the memory and corresponding dual-rail inputs of the processor, each S2D element configured to:
    receive a single-rail signal from the memory, and
    output a dual rail value to the processor, the dual-rail value alternating between a null state and a valid dual-rail conversion of the single rail signal in response to a third acknowledge signal generated by the processor.

4. The self-timed processing system of claim 3, wherein the second acknowledge signal is the third acknowledge signal.

5. The self-timed processing system of claim 3, further comprising:
    a second acknowledge tree to generate the second acknowledge signal.

6. The self-timed processing system of claim 5, wherein the third acknowledge signal is individually routed from each of the one or more S2D elements to respective inputs of the second acknowledge tree.

7. The self-timed processing system of claim 5, further comprising:
    respective OR gates associated with each S2D element, each OR gate having two inputs that receive the respective dual-rail value and an output that provides a respective fourth acknowledge signal indicating if the dual rail value is null or valid,
    wherein the fourth acknowledge signals from the one or more S2D elements are applied to respective inputs of the second acknowledge tree.

8. The self-timed processing system of claim 1, wherein the first converter circuits further comprise:
    one or more memory/acknowledge (MEMA) elements respectively coupled between dual-rail outputs of the processor and corresponding single-rail inputs of the memory, each MEMA element configured to:
    receive the respective dual-rail NCL value output from the processor,
    convert the dual-rail value to a single-rail signal when the respective dual-rail value is valid,
    hold the single-rail signal when the respective dual-rail value changes to null, and
    provide a respective fourth acknowledge signal indicating whether the respective dual rail value is valid or null.

9. The self-timed processing system of claim 8, further comprises:
    a first acknowledge tree that receives the fourth acknowledge signals from the one or more MEMA elements and generates the first acknowledge signal.

10. A method for operating a processing system including an asynchronous null convention logic (NCL) processor and a synchronous memory, comprising:
    converting one or more dual-rail NCL values output from the processor to single-rail input signals coupled to respective inputs of the memory;
    generating a first acknowledge signal indicating that the single-rail input signals are ready to be accepted by the memory;
    converting one or more single rail data signals output from the memory to dual-rail values coupled to respective inputs of the processor;
    generating a second acknowledge signal indicating that dual-rail values based on single rail data signals previously output from the memory have been accepted by the processor; and
    combining the first acknowledge signal and the second acknowledge signal to generate a clock signal for the memory.

11. A self-timed processing system comprising:
    an asynchronous null convention logic (NCL) processor;
    a synchronous memory that accepts input signals on an active edge of a memory clock signal, the input signals being based on output signals of the processor;
    an output interface configured to
    convert one or more dual-rail NCL values output from the processor to single-rail input signals coupled to respective inputs of the memory, and
    generate a first acknowledge signal indicating that the input signals are ready to be accepted by the memory;
    an input interface configured to
    convert one or more single rail data signals output from the memory to dual-rail values coupled to respective inputs of the processor, and generate a second acknowledge signal indicating that data signals previously output from the memory have been converted to dual-rail values and accepted by the processor; and logic to combine first and second acknowledge signals to generate the memory clock signal.

12. The self-timed processing system of claim 11, wherein the logic to combine the first and second acknowledge signals comprises a C element.

13. The self-timed processing system of claim 11, wherein the output interface further comprises:

one or more memory/acknowledge (MEMA) elements respectively coupled between dual-rail outputs of the processor and corresponding single-rail inputs of the memory, each MEMA element configured to:
receive the respective dual-rail NCL value output from the processor,
convert the dual-rail value to a single-rail signal when the respective dual-rail value is valid,
hold the single-rail signal when the respective dual-rail value changes to null, and
provide a respective fourth acknowledge signal indicating whether the respective dual rail value is valid or null.

14. The self-timed processing system of claim 13, wherein the output interface further comprises:

a first acknowledge tree that receives the fourth acknowledge signals from the one or more MEMA elements and generates the first acknowledge signal.

15. The self-timed processing system of claim 11, wherein the input interface further comprises:

one or more single to dual converter (S2D) elements respectively coupled between single-rail outputs of the memory and corresponding dual-rail inputs of the processor, each S2D element configured to:
receive a single-rail signal from the memory, and
output a dual rail value to the processor, the dual-rail value alternating between a null state and a valid dual-rail conversion of the single rail signal in response to a third acknowledge signal generated by the processor.

16. The self-timed processing system of claim 15, wherein the second acknowledge signal is the third acknowledge signal.

17. The self-timed processing system of claim 15, further comprising:

a second acknowledge tree to generate the second acknowledge signal.

18. The self-timed processing system of claim 17, wherein the third acknowledge signal is individually routed from each of the one or more S2D elements to respective inputs of the second acknowledge tree.

19. The self-timed processing system of claim 17, further comprising:

respective OR gates associated with each S2D element, each OR gate having two inputs that receive the respective dual-rail value and an output that provides a respective fourth acknowledge signal indicating if the dual rail value is null or valid,
wherein the fourth acknowledge signals from the one or more S2D elements are applied to respective inputs of the second acknowledge tree.

* * * * *